(12) United States Patent
Ferriggi, Jr.

(10) Patent No.: US 8,998,547 B2
(45) Date of Patent: Apr. 7, 2015

(54) CARGO CATCH

(71) Applicant: Richard H. Ferriggi, Jr., East Northport, NY (US)

(72) Inventor: Richard H. Ferriggi, Jr., East Northport, NY (US)

( * ) Notice: Subject to any disclaimer, the term of this patent is extended or adjusted under 35 U.S.C. 154(b) by 42 days.

(21) Appl. No.: 13/875,010

(22) Filed: May 1, 2013

(65) Prior Publication Data
US 2014/0326763 A1    Nov. 6, 2014

(51) Int. Cl.
   *B60P 7/08*   (2006.01)
   *B60R 9/06*   (2006.01)

(52) U.S. Cl.
   CPC ........................ *B60R 9/06* (2013.01)

(58) Field of Classification Search
   USPC ............... 410/121, 129, 34, 96, 97, 100, 103, 410/117, 118, 140; 248/499; 87/2, 12
   See application file for complete search history.

(56) References Cited

U.S. PATENT DOCUMENTS

| | | | |
|---|---|---|---|
| 3,978,996 A | 9/1976 | Oltrogge | |
| 4,770,579 A | 9/1988 | Aksamit | |
| 4,964,771 A | 10/1990 | Callihan | |
| 5,452,973 A * | 9/1995 | Arvin | 410/118 |
| 5,509,764 A | 4/1996 | Shives | |
| 5,915,911 A | 6/1999 | Hodgetts | |
| 5,997,233 A | 12/1999 | Whatley et al. | |
| 6,086,313 A | 7/2000 | Plaehn | |
| 6,524,043 B2 | 2/2003 | Earle et al. | |
| 6,939,096 B1 | 9/2005 | Cline et al. | |
| 7,111,886 B1 | 9/2006 | Miller et al. | |
| 7,175,218 B1 | 2/2007 | Keene | |
| 7,195,432 B2 | 3/2007 | Earle et al. | |
| 7,488,021 B1 | 2/2009 | Roos et al. | |
| 8,272,821 B2 * | 9/2012 | Digman | 410/115 |
| 2004/0134953 A1 | 7/2004 | Perez | |
| 2011/0243697 A1 | 10/2011 | Braun et al. | |

* cited by examiner

*Primary Examiner* — Stephen Gordon
(74) *Attorney, Agent, or Firm* — Scully, Scott, Murphy & Pressser, PC

(57) ABSTRACT

A cargo holding apparatus configured to secure cargo in a pickup truck cargo bed and facilitate unloading of the cargo therefrom is provided with a holding frame having cross members forming a top and a bottom of the holding frame; and side support members forming a left side and a right side of the holding frame, where the cross members being joined to the side support members at each end; a strap secured to each side support member, the strap being dimensioned to extend at least a length of the cargo bed; and a clamping member disposed and a left and a right side vertical walls of the cargo bed at a position nearest a lift gate of the cargo bed, each of the straps being fed through respective clamping members, the respective clamping members securely holding each strap when in an engaged aspect and allowing each strap to slide unrestricted when in a disengaged aspect.

9 Claims, 3 Drawing Sheets

CARGO CATCH

I. FIELD OF THE INVENTION

This invention relates to pickup truck cargo bed accessories. More specifically, the invention relates to a system for holding cargo in place and providing easy unloading of the cargo.

I. BACKGROUND OF THE INVENTION

Pickup trucks are widely used for commercial purposes where the cargo bed is utilized to haul construction supplies, machinery, and other bulky or large quantity materials. Pickup trucks are also used for recreational and personal purposes. The cargo bed of a pickup truck provides an extended hauling capacity. However, because of the depth of the cargo bed, objects placed in the cargo bed have a tendency to shift around. The movement of objects in the cargo bed can result in damage to the objects or even the walls of the cargo bed. Additionally, the depth and height of the cargo bed make retrieval of objects difficult, especially, if the objects are small or have shifted towards the cab portion of the pickup truck.

In an effort to minimize shifting of objects, devices are available for tying down or holding objects against a wall of the cargo bed. Most such devices require extensive modification of the cargo bed, such as by installing rail systems and the like. Moreover, most devices for holding objects in place are configured for holding the objects against the wall closest to the cab of the pickup truck, i.e., farthest away from the tail gate. In this configuration, it is difficult to retrieve objects from the cargo bed.

II. SUMMARY OF THE INVENTION

An object of the invention is a system for holding objects of arbitrary shapes and sizes stationary in a cargo bed of a pickup truck.

Another object of the invention is a system for facilitating unloading of objects from a cargo bed by providing a mechanism for moving the held objects towards the tail gate of the pickup truck.

An embodiment of the present invention provides an apparatus that includes a holding frame having cross members forming a top and a bottom of the holding frame and side support members forming a left side and a right side of the frame. The cross members are joined to the side support members at each end. A strap, dimensioned to extend at least a length of the cargo bed, is secured to each side support member. A clamping member is disposed at left and right side vertical walls of the cargo bed at a position nearest a tail gate of the cargo bed. Each of the straps is fed through respective clamping members, which securely hold each strap when in an engaged aspect and allowing each strap to slide unrestricted when in a disengaged aspect.

III. BRIEF DESCRIPTION OF THE DRAWINGS

These and other features, aspects, and advantages of the present invention will become better understood with regard to the following description, appended claims, and accompanying drawings wherein:

IV. DETAILED DESCRIPTION OF INVENTION

Figure 1:
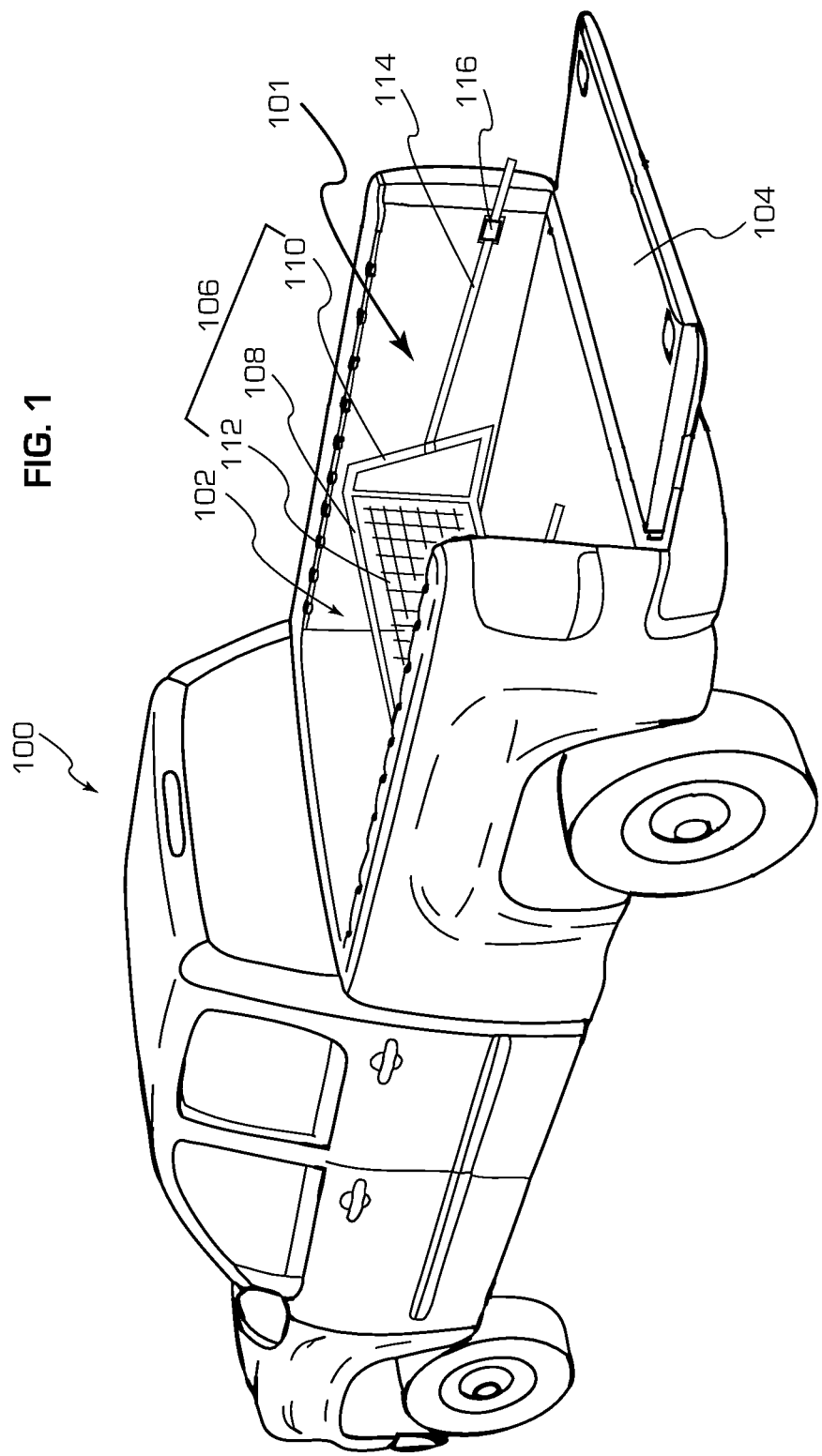
FIG. 1 illustrates a perspective view of an embodiment of the present invention installed in a pickup truck cargo bed.

For clarity, the disclosure applies like reference numerals to like structures throughout the figures. Moreover, terms used for structures and elements of the present invention are given their common meaning unless otherwise defined herein.

Referring to FIG. 1, an embodiment of the present invention is shown installed in a pickup truck 100. As shown, the pickup truck 100 includes a cargo bed area 102 and a tail gate 104 disposed at a rear end of the cargo bed 102. A holding frame 106 is placed in the cargo bed 102. The holding frame 106 is formed of a cross member 108 defining a top and bottom of the holding frame 106. Additionally, side support members 110 are disposed at each free end of the cross member 108. The combination of the cross member 108 and the side support members 110 define a rectangular space that spans the width of the cargo bed 102. Moreover, the rectangular space is overlaid with a flexible screen 112.

With respect to the present invention, the width direction of the cargo bed is intended to refer the direction perpendicular to the front-back axis of the pickup truck 100. The depth direction is understood to refer to the direction along the front-back axis of the pickup truck 100.

The cross member 108 and the side support members 110 may be constructed of any appropriately rigid material. Some examples of appropriate materials include, but are not limited to, aluminum, steel, polycarbonate plastic, polyvinylchloride plastic, and carbon fiber. In an embodiment of the present invention, the cross member 108 and the side support members 110 have hollow circular cross-sections. Alternatively, the cross-sections of the cross member 108 and the side support members 110 may be hollow polygonal or triangular. Further, one or more of the cross member 108 and the side support members 110 may have a solid core rather than hollow. The cross member 108 is coupled to the side support member 110 at each end by means of well known techniques such as welding, epoxy, and treaded joints.

The flexible screen 112 is formed of any appropriately flexible material. Additionally, the flexible screen 112 may be formed of a material that is resilient. For example, nylon cord, vinyl, reinforced plastics, metal cables, and other man-made and natural fibers may be effectively used to form the flexible screen 112. The material forming the flexible screen 112 is woven together, i.e. strips or cords of the material are disposed vertically and horizontally between the cross members 108 and the side support members 110 and interwoven. The weave need not be tight. Rather, the weave in one embodiment may have voids of several inches vertically and horizontally. However, the voids should not be so large as to allow objects normally intended to be transported in the cargo bed to pass through the flexible screen 112 easily.

In addition, the apparatus 101 also includes a strap 114, formed of nylon, polyester or metallic material, that is attached to a point on each of the side support members 110. The strap is dimensioned to extend the entire depth of the cargo bed 102 with additional length extending beyond the rear end of the cargo bed 102.

The apparatus 101 further includes a clamping device 116 anchored to a left rear side and right rear side of the cargo bed 102. In an embodiment of the present invention, the clamping device 116 is positioned near the tail gate 104 in the closed position. The clamping device 116 is configured and dimensioned to accept a free end of the strap 114. Additionally, in an engaged aspect, the clamping device 116 holds the strap 114 with sufficient force so as to prevent slippage of the strap 114 therethrough from the weight of objects being held by the present invention. Moreover, in a disengaged aspect, the clamping device 116 allows unrestricted sliding of the strap 114 therethrough.

Figure 2:
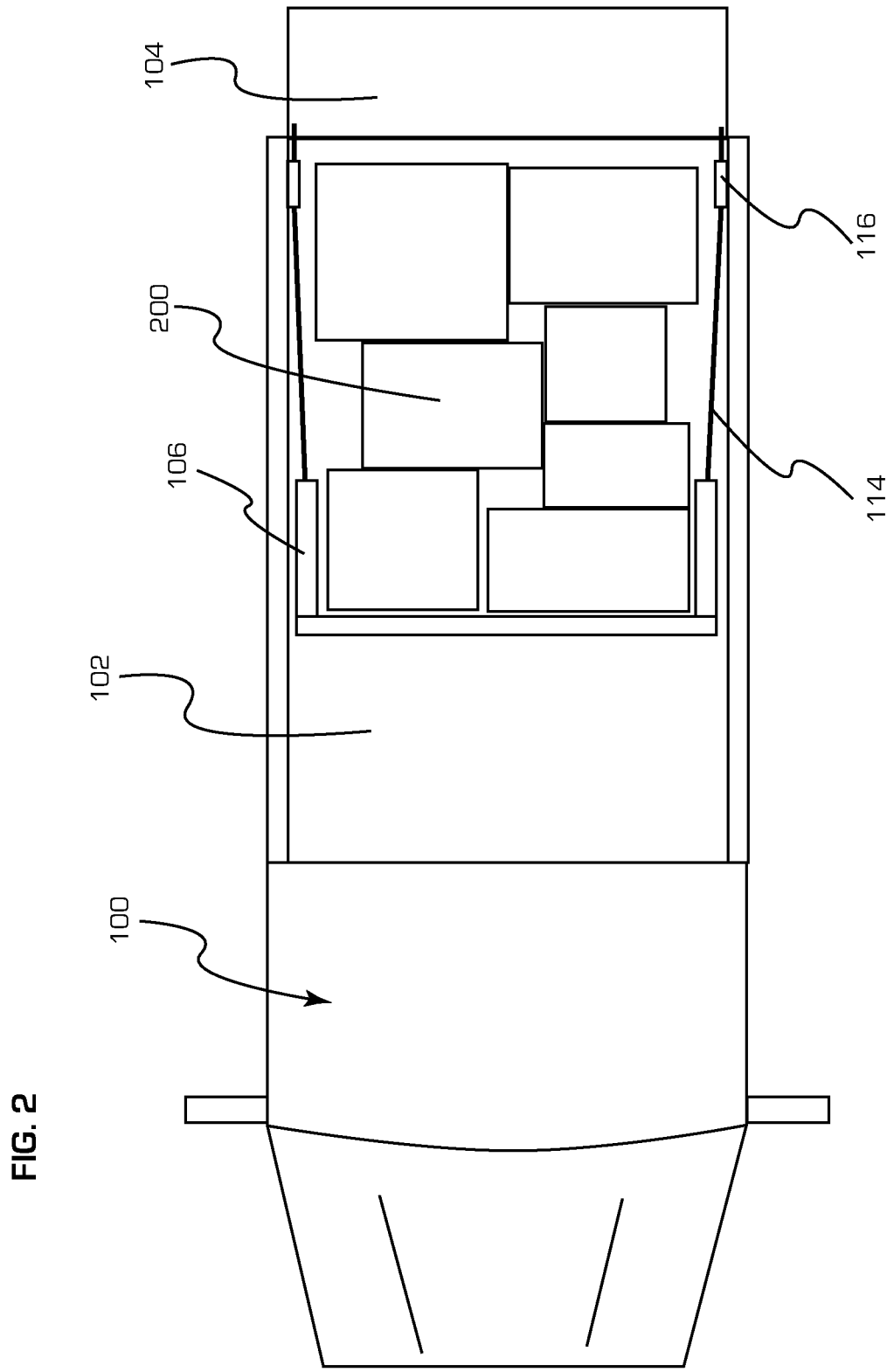
FIG. 2 illustrates a plan view of an embodiment of the present invention in use.

Referring to FIG. 2, a plan view is shown of an embodiment of the present invention installed in a cargo bed 102 of pickup truck 100. As shown, the holding frame 106 is disposed across the cargo bed 102. Moreover, a plurality of containers 200 are positioned between the holding frame 106 and the tail gate 104 when the tail gate is in a closed position. The straps 114 anchored by the clamping members 116, in an engaged aspect, hold the holding frame 106 against the plurality of containers 200 such that the containers 200 are restricted from moving along the depth direction of the cargo bed 102. When the clamping members 116 are in a disengaged aspect, the straps 114 can be freely pulled to move the holding frame 106 rearward, towards the tail gate 104 end of the cargo bed 102. The holding frame 106 is pressed against the containers 200 and the containers 200 are, in turn, pressed against the tail gate 104 when the tail gate 104 is in the closed position. Locking the clamping members 116 in the engaged aspect holds the straps 114, thus maintaining the pressing force on the containers 200 by the holding frame 106 at one side and the tail gate 104 at the other side. As a result, shifting of containers 200 held in the cargo bed 102 is reduced.

When the containers 200 are ready to be unloaded, the clamping members 116 are placed into the disengaged aspect and the straps 114 are further pulled rearward. Pulling the straps 114 causes the holding frame 106 to move rearward as well. With the tail gate 104 in the open position, the rearward motion of the holding frame 106 advances the containers 200 towards the tail gate 104, allowing an operator to easily reach the containers 200. The holding frame 106 is moved rearward until all the containers 200 have been moved to the edge of the tail gate 104 and removed from the cargo bed 102.

Figure 3:
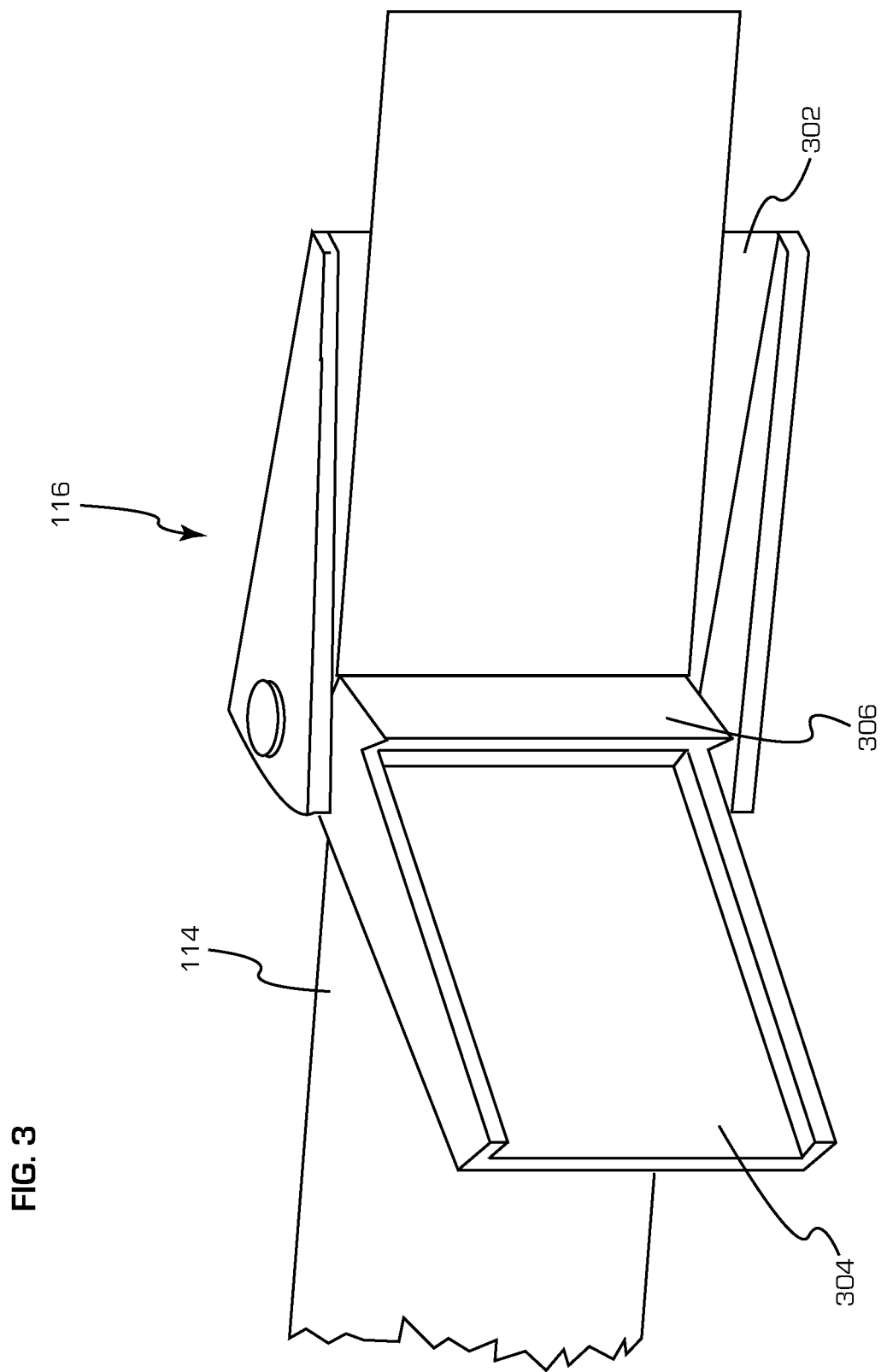
FIG. 3 illustrates a clamping device of an embodiment of the present invention.

FIG. 3 shows an example of a clamping device 116 applicable to the present invention. Alternative clamping devices, which have sufficient holding force when engaged to prevent slippage of the strap 114 while allowing unrestricted sliding of the strap 114 when the clamping device is disengaged, can be used in embodiments of the present invention. The example clamping device 116 includes a base plate 302 configured to be affixed to a vertical side panel of a cargo bed. Additionally, a handle lever 304 is rotatably mounted to the base plate 302. The handle lever 304 includes an engaging portion 306 configured to provide a crimping force against the strap 114 when the handle lever 304 is rotated towards the base plate 302, thus placing the clamping device 116 in an engaged aspect. When the handle lever 304 is rotated into the position shown in FIG. 3, the clamping device 116 is in a disengaged aspect that allows the strap 114 to slide freely.

While the present invention is described above as applicable to pickup trucks, the present invention can be readily applied to other types of vehicles with large cargo holding areas as well. For example, the present invention can be used in cargo vans, mini vans, sport utility vehicles, and cargo trailers.

In an embodiment of the present invention, the holding frame is dimensioned to have a height equivalent to the height of the side walls of the cargo bed measured inside the cargo bed, such that the top surface of the cargo bed side walls and the top surface of the holding frame are coplanar.

In another embodiment, the holding frame has a height less than the height of the cargo bed side walls. In this embodiment, long cargo, such as lumber can be rested on the top surface of the holding frame while still being encircled by the walls of the cargo bed.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An apparatus for securing and facilitating unloading of containers in a cargo bed of a pickup truck, the apparatus comprising:
   a holding frame configured to be movably positioned within a cargo bed of a pickup truck, the cargo bed having a width extending in a direction of a wheel axle of the pickup truck and a depth extending perpendicular to the width, the holding frame comprising:
      a pair of cross members forming a top and a bottom of the holding frame, the cross members extending in the width direction; and
      a pair of side support members forming a left side and a right side of the holding frame,
         the cross members being joined to the side support members at a respective end of each of the cross members, the side support members forming a pair of side sections extending in the depth direction toward a tail gate of the pickup truck;
   a pair of straps, each strap of the pair of straps being secured to a respective one of said side support members, the straps being dimensioned to extend at least a length of the cargo bed in the depth direction; and
   a pair of clamping members, each of the clamping members being disposed on a respective left and right side vertical wall of the cargo bed at a position adjacent the tail gate, each of the straps being fed through a respective one of the clamping members, the pair of clamping members securely holding each strap when in a closed position and allowing each strap to slide unrestricted when in an open position.

2. The apparatus as in claim 1, wherein the holding frame further comprises a flexible screen covering an area bounded by the cross members and side support members.

3. The apparatus as in claim 2, wherein the flexible screen is constructed of strips formed from one or more materials selected from a group consisting of: nylon cord, vinyl, plastics, and metal cables.

4. The apparatus as in claim 3, wherein strips are woven into an open mesh configuration.

5. The apparatus as in claim 1, wherein the holding frame is dimensioned to span a width of the cargo bed.

6. The apparatus as in claim 1, wherein the holding frame is configured to abut against one or more containers at a side facing the tail gate.

7. The apparatus as in claim 1, wherein the cross members and side support members are constructed of one or more materials selected from a group consisting of: aluminum, steel, polycarbonate plastic, polyvinylchloride plastic, and carbon fiber.

8. The apparatus of claim 1, wherein the pair of straps are configured to restrict movement of cargo between the tail gate and the holding frame when the clamping members are in the closed position.

9. The apparatus of claim 1, wherein the pair of straps are configured to allow movement of the holding frame toward the tail gate when the clamping members are in the open position.

* * * * *